US012619076B2

(12) United States Patent
Spoczynski et al.

(10) Patent No.: US 12,619,076 B2
(45) Date of Patent: May 5, 2026

(54) OFFLOADED DATA PROCESSING FOR NAMED BASED DATA TRANSMISSIONS

(71) Applicant: Intel Corporation, Santa Clara, CA (US)

(72) Inventors: Marcin Spoczynski, Hillsboro, OR (US); Hao Feng, Hillsboro, OR (US); Maruti Gupta Hyde, Portland, OR (US); Nageen Himayat, Fremont, CA (US); Srikathyayani Srikanteswara, Portland, OR (US); Yi Zhang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 18/056,266

(22) Filed: Nov. 17, 2022

(65) Prior Publication Data

US 2023/0195538 A1     Jun. 22, 2023

(30) Foreign Application Priority Data

Dec. 22, 2021     (EP) ..................................... 21216922

(51) Int. Cl.
G06F 9/54          (2006.01)
G02B 6/122          (2006.01)
(Continued)

(52) U.S. Cl.
CPC ....... G02B 27/0172 (2013.01); G02B 6/1225 (2013.01); G02B 27/0101 (2013.01);
(Continued)

(58) Field of Classification Search
None
See application file for complete search history.

(56) References Cited

U.S. PATENT DOCUMENTS

2010/0284085 A1     11/2010  Laakkonen
2013/0243001 A1*     9/2013  Byun ...................... H04L 45/00
                                                                370/392
(Continued)

FOREIGN PATENT DOCUMENTS

WO          2022135918 A1     6/2022

OTHER PUBLICATIONS

European Search Report issued for the corresponding European application No. 21 21 6922, dated May 27, 2022, 8 pages (only for informational purposes).
(Continued)

*Primary Examiner* — Umut Onat
(74) *Attorney, Agent, or Firm* — Viering, Jentschura & Partner mbB

(57)          ABSTRACT

A device may include a processor that includes a named data network (NDN) forwarding daemon (NFD) module. The NFD module may be configured to identify an accelerator on which to configure an offloaded NFD module based on a configuration table indicating a current configuration of the accelerator. The NFD module may be configured to configure the offloaded NFD module on the identified accelerator. The NFD module may be configured to receive an interest packet that includes a workload request. The interest packet may be configured according to an NDN protocol. The NFD module may be configured to determine that the offloaded NFD module is configured to perform the workload request using the identified accelerator based on the configuration table. The NFD module may be configured to offload, via an application programming interface, the workload request to the offloaded NFD module to perform the workload request using the identified accelerator.

20 Claims, 5 Drawing Sheets

(51) Int. Cl.
    *G02B 27/01*       (2006.01)
    *H04M 1/72406*     (2021.01)

(52) U.S. Cl.
    CPC .......... *G06F 9/54* (2013.01); *H04M 1/72406*
             (2021.01); *G02B 2027/0118* (2013.01)

(56)                References Cited

U.S. PATENT DOCUMENTS

| | | | |
|---|---|---|---|
| 2014/0181140 A1* | 6/2014 | Kim | H04L 67/06 |
| | | | 707/769 |
| 2018/0143485 A1 | 5/2018 | Oh | |
| 2018/0180793 A1 | 6/2018 | Fattal | |
| 2018/0316614 A1* | 11/2018 | Liu | H04L 47/12 |
| 2020/0110261 A1 | 4/2020 | Grey et al. | |
| 2020/0241295 A1 | 7/2020 | Fattal | |
| 2020/0412836 A1 | 12/2020 | Arrobo Vidal et al. | |
| 2021/0314232 A1 | 10/2021 | Nainar et al. | |
| 2023/0185760 A1* | 6/2023 | Balle | G06F 15/7821 |
| | | | 712/35 |

OTHER PUBLICATIONS

International Preliminary Report on Patentability issued for the corresponding International Patent Application No. PCT/EP2021/084662, dated Jun. 27, 2023, 12 pages (for informational purposes only).

* cited by examiner

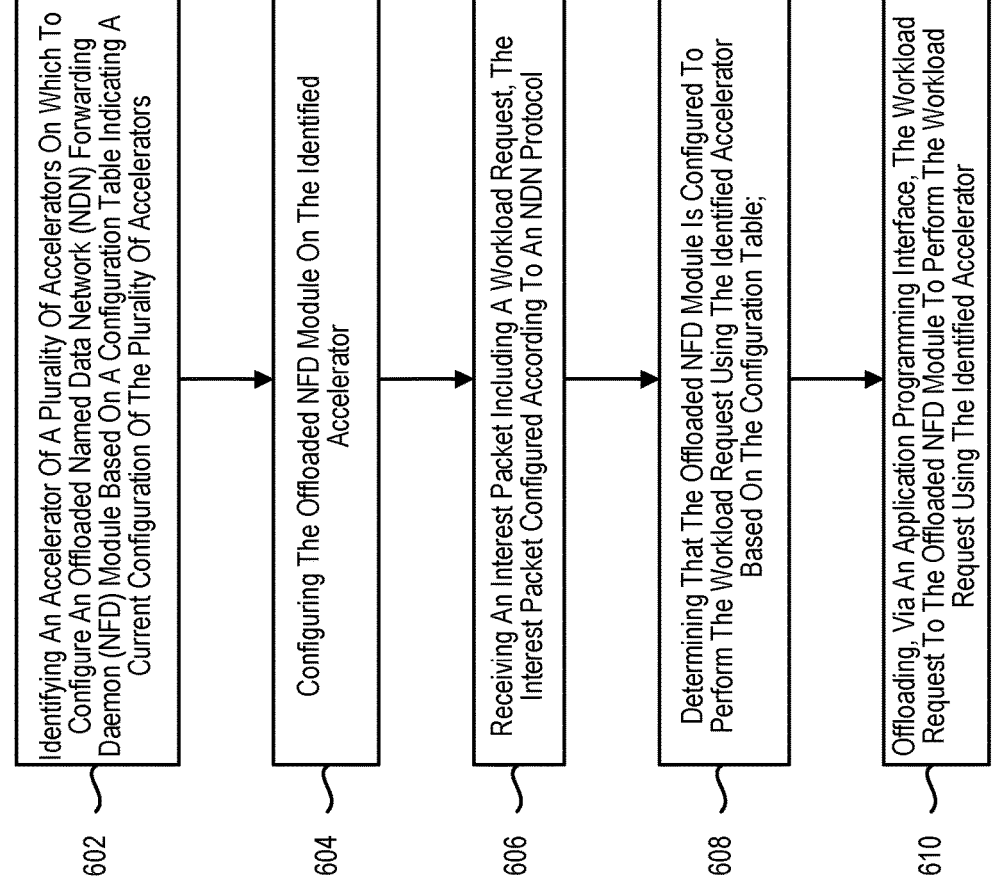

602  Identifying An Accelerator Of A Plurality Of Accelerators On Which To Configure An Offloaded Named Data Network (NDN) Forwarding Daemon (NFD) Module Based On A Configuration Table Indicating A Current Configuration Of The Plurality Of Accelerators 604  Configuring The Offloaded NFD Module On The Identified Accelerator 606  Receiving An Interest Packet Including A Workload Request, The Interest Packet Configured According To An NDN Protocol 608  Determining That The Offloaded NFD Module Is Configured To Perform The Workload Request Using The Identified Accelerator Based On The Configuration Table;

610  Offloading, Via An Application Programming Interface, The Workload Request To The Offloaded NFD Module To Perform The Workload Request Using The Identified Accelerator

OFFLOADED DATA PROCESSING FOR NAMED BASED DATA TRANSMISSIONS

RELATED APPLICATION(S)

This application claims priority to and the benefit of European Patent Application EP21216922.1, filed Dec. 22, 2021, which is incorporated herein by reference in its entirety.

FIELD

The aspects discussed in the present disclosure are related to offloading data processing for named based data transmissions.

BACKGROUND

Unless otherwise indicated in the present disclosure, the materials described in the present disclosure are not prior art to the claims in the present application and are not admitted to be prior art by inclusion in this section.

A local area network (LAN) may include a device configured to communicate with another device within the LAN. In addition, the device may be configured to communicate with a remote device via a wide area network (WAN). The device may transfer data within the LAN or via the WAN in accordance with a named data network (NDN) protocol. The NDN protocol may permit the device to identify routes for transferring the data using named function networking.

The subject matter claimed in the present disclosure is not limited to aspects that solve any disadvantages or that operate only in environments such as those described above. Rather, this background is only provided to illustrate one example technology area where some aspects described in the present disclosure may be practiced.

BRIEF DESCRIPTION OF THE DRAWINGS

Example aspects will be described and explained with additional specificity and detail through the use of the accompanying drawings in which:

FIG. 5 illustrates a flowchart of an exemplary method to offload functions to different accelerators using the NDN protocol, all according to at least one aspect described in the present disclosure.

DETAILED DESCRIPTION

Figure 1:
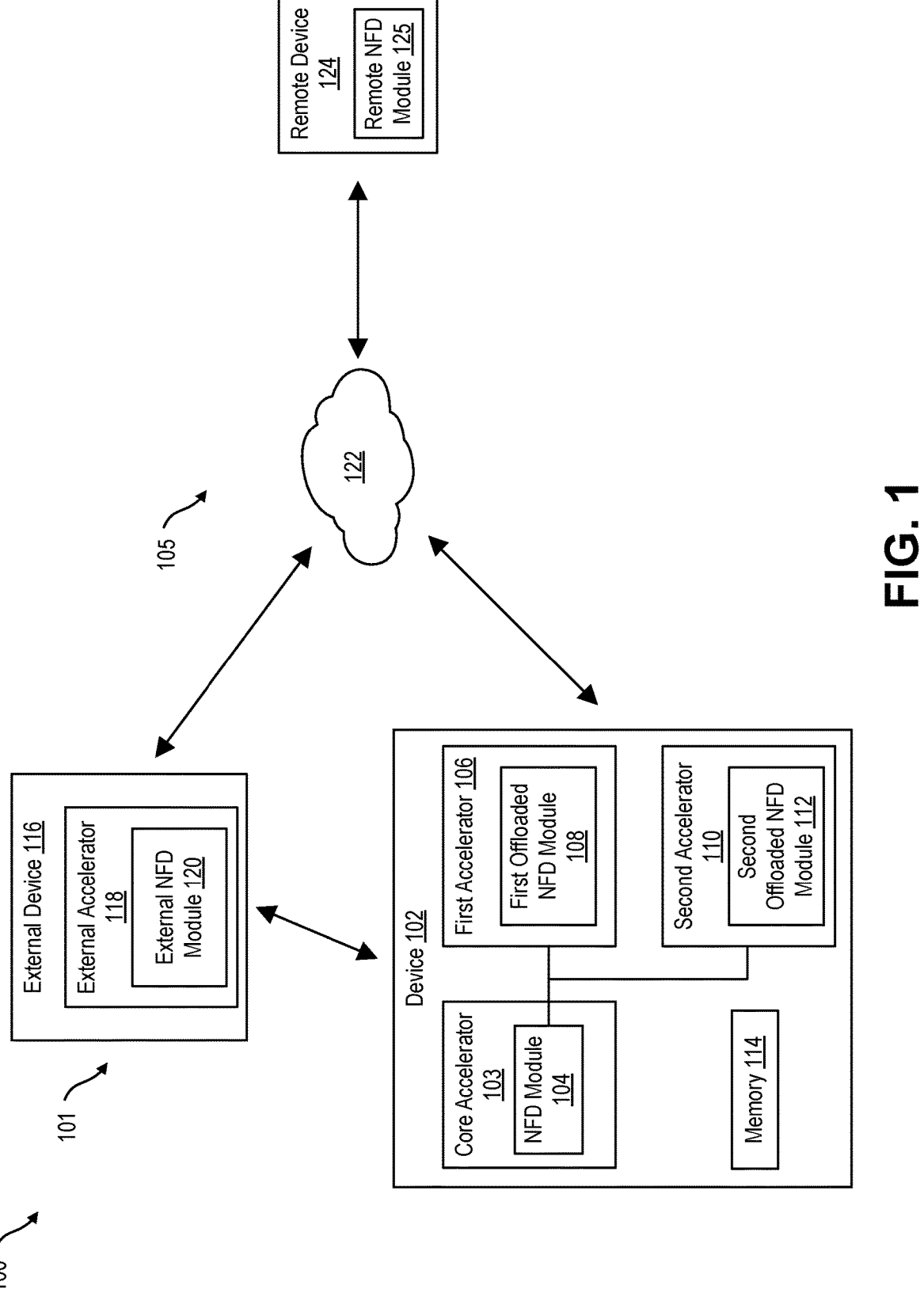
FIG. 1 illustrates a block diagram of an exemplary operational environment to offload a workload request within a LAN or a WAN.

A LAN may include a device (e.g., a host device) configured to communicate with another device within the LAN. In addition, the device may be configured to communicate with a remote device via a WAN (e.g., the Internet).

The device may transfer data within the device, within the LAN, or via the WAN in accordance with an NDN protocol. The device may include a modular build to implement the NDN protocol in different network types (e.g., a fifth-generation network or a wireless fidelity (Wi-Fi) network). The LAN may be implemented in a automation system (e.g., industrial automation system), an edge network, or some combination thereof.

The NDN protocol may permit the device to identify routes for transferring the data using named function networking (NFN) (e.g., based on an associated content name). The device may include an NDN forwarding daemon (NFD) module that identifies potential routes to transfer the data based on the associated content name rather than an associated Internet protocol (IP) address. The NFD module may identify associations between a content name of the data and an interface (e.g., a face) over which the data is received. The interfaces may include a peripheral component interconnect express (PCI-E) interface, a transmission control protocol/Internet protocol (TCP/IP) overlay tunnel, an interprocess communication (IPC) interface, an Ethernet interface, an application programming interface (API), a Wi-Fi interface, a modem interface (e.g., physical network interfaces), or some combination thereof.

The device may perform a workload request (e.g., a function) in accordance with the NDN protocol. For example, the device may perform an IP pipeline function, a content caching function, an onboard forwarding strategy function, or some combination thereof in accordance with the NDN protocol.

In some NFD technologies, the NFD module may be implemented in a core accelerator (e.g., a central processor unit (CPU) or a core processor). In these NFD technologies, the NFD module may perform a workload request using only the core accelerator. In these NFD technologies, the NFD module may perform the workload request without considering capabilities of the core accelerator, other accelerators, or some combination thereof. Therefore, the NFD module may perform the workload request using only the core accelerator and may not offload the workload request to the other accelerators (e.g., a first accelerator within the device, a second accelerator within the device, an external accelerator within an external device, or a remote NFD module within a remote device (collectively referred to in the present disclosure as "other accelerators")). The core accelerator and the other accelerators may include a cross-architecture processing unit (xPU), a field programmable gate array (FPGA), an application-specific integrated circuit (ASIC), a general processing unit (GPU), and a different CPU.

One or more aspect described in the present disclosure may include an NFD module configured to offload the workload request to the other accelerators based on capabilities of the core accelerator, the other accelerators, or some combination thereof. The NFD module may offload performance of the workload request to the first accelerator or the second accelerator using the API. The NFD module may offload performance of the workload request to the external accelerator or the remote NFD module using a different interface. The other accelerators may perform the offloaded workload request, which may increase efficiency of the device compared the core accelerator always performing the workload request.

A device may include a processor that includes the NFD module. The device may include multiple accelerators. The NFD module may identify a first accelerator within the device on which to configure a first offloaded NFD module.

The NFD module may identify the first accelerator based on a configuration table indicating a current configuration of the accelerators within the device. The NFD module may also configure the first offloaded NFD module on the first accelerator.

The NFD module may receive an interest packet that includes a workload request. The interest packet may be configured according to the NDN protocol. The NFD module may also determine that the first offloaded NFD module is configured to perform the workload request using the first accelerator. The NFD module may use the configuration table to determine that the first offloaded NFD module is configured to perform the workload request. In addition, the NFD module may offload, via the API, the workload request to the first offloaded NFD module. The first offloaded NFD module may perform the workload request using the corresponding accelerator.

Alternatively, the NFD module may determine that the first offloaded NFD module is not configured to perform the workload request based on the configuration table. The NFD module may determine that a different NFD module is configured to perform the workload request using a corresponding accelerator based on the configuration table. The NFD module may offload, via an interface, the workload request to the different NFD module. The different NFD module may perform the workload request using the corresponding accelerator. The different NFD module may include an external NFD module within an external device or a remote NFD module within a remote device.

The NFD module offloading the workload request to one of the other accelerators may increase a memory speed, reduce processing time, reduce transmission time, reduce power consumption of the device, or some combination thereof to perform the workload request compared to the core accelerator always performing the workload request. For example, the NFD module may increase the memory speed using a specialized lookup cache (e.g., the configuration table) to perform string matching operations. As another example, the NFD module may increase the transmission speed using a different interface rather than just the PCI-E interface. The NFD module offloading the workload request to one of the other accelerators may also permit the NFD module to offload a caching content function, an interest forwarding function, or a name resolution function considering hardware capabilities of the core accelerator and the other accelerators.

These and other aspects of the present disclosure will be explained with reference to the accompanying figures. It is to be understood that the figures are diagrammatic and schematic representations of such example aspects, and are not limiting, nor are they necessarily drawn to scale. In the figures, features with like numbers indicate like structure and function unless described otherwise.

FIG. 1 illustrates a block diagram of an exemplary operational environment 100 to offload a workload request within a LAN 101 or a WAN 105, in accordance with at least one aspect described in the present disclosure. The operational environment 100 may include the LAN 101 and the WAN 105. The LAN 101 may include a device 102 and an external device 116. The WAN 105 may include a network 122 (e.g., the Internet) and a remote device 124. In addition, the WAN 105 may include the device 102, the external device 116, or some combination thereof.

The device 102 may include a core accelerator 103, a first accelerator 106, a second accelerator 110, and a memory 114. The core accelerator 103 may include an NFD module 104 that is communicatively coupled to the first accelerator 106 and the second accelerator 110. The NFD module 104 may be communicatively coupled to the first accelerator 106 and the second accelerator 110 via an API. The NFD module 104 may also be communicatively coupled to an external accelerator 118 within the external device 116. The core accelerator 103, the first accelerator 106, the second accelerator 110, and the external accelerator 118 may each include an xPU, an FPGA, an ASIC, a GPU, or a CPU.

The NFD module 104 may be communicatively coupled to the remote device 124 via the network 122. The NFD module 104 may be communicatively coupled to the first accelerator 106, the second accelerator 110, the external accelerator 118, and the remote device 124 via a PCI-E interface, a TCP/IP overlay tunnel, an IPC interface, an Ethernet interface, the API, a Wi-Fi interface, a modem interface (e.g., physical network interfaces), or some combination thereof.

The NFD module 104 may include code and routines configured to enable the core accelerator 103 to perform one or more operations with respect to offloading the workload request. Additionally or alternatively, the NFD module 104 may be implemented using hardware including a processor, a microprocessor (e.g., to perform or control performance of one or more operations), an FPGA, an ASIC, or any other appropriate accelerator. The NFD module 104 may be implemented using a combination of hardware and software.

The memory 114 may store data being processed by the NFD module 104, the first accelerator 106, the second accelerator 110, or some combination thereof. In addition, the memory 114 may store a configuration table, internal telemetry data, a pending interest table, a routing information base (RIB), a content store (CS), data indicating an amount of traffic, and a request to the CS, or other data to permit the NFD module 104, the first accelerator 106, or the second accelerator 110 to perform the operations described in the present disclosure.

The NFD module 104 may identify the first accelerator 106 for configuration of a first offloaded NFD module 108. The NFD module 104 may identify the first accelerator 106 based on the configuration table. The configuration table may indicate a current configuration of the core accelerator 103, the first accelerator 106, and the second accelerator. The NFD module 104 may also identify the second accelerator 110 for configuration of a second offloaded NFD module 112. The NFD module 104 may configure the first offloaded NFD module 108 on the first accelerator 106 and the second offloaded NFD module on the second accelerator 110. The NFD module 104 may configure the first offloaded NFD module 108 to perform a first offloaded function of the NFD module 104. The NFD module 104 may configure the second offloaded NFD module 110 to perform a second offloaded function of the NFD module 104.

The NFD module 104 may receive a first interest packet that includes a first workload request. The first interest packet may be configured according to the NDN protocol. The NFD module 104 may receive the first interest packet from the external device 116 or another device (not illustrated in FIG. 1) within the LAN 101.

An example in which the NFD module 104 determines that the first offloaded NFD module 108 is configured to perform the first workload request using the first accelerator 106 is now described. The NFD module 104 may determine that the first offloaded NFD module 108 is configured to perform the first workload request based on the configuration table. The NFD module 104 may also offload, via the API, the first workload request to the first offloaded NFD module 108. The first offloaded NFD module 108 may perform the first workload request using the first accelerator 106.

An example in which the NFD module 104 determines that the first offloaded NFD module 108 is not configured to perform the first workload request, but that the second offloaded NFD module 112 is configured to perform the first workload request using the second accelerator 110 is now described. The NFD module 104 may determine that the second offloaded NFD module 112 is configured to perform the first workload request based on the configuration table. The NFD module 104 may also offload, via the API, the first workload request to the second offloaded NFD module 112. The second offloaded NFD module 112 may perform the first workload request using the second accelerator 110.

An example in which the NFD module 104 determines that the first offloaded NFD module 108 and the second offloaded NFD module 112 are not configured to perform the first workload request, but that a different NFD module is configured to perform the first workload request using a corresponding accelerator is now discussed. The NFD module 104 may determine that the different module is configured to perform the first workload request based on the configuration table. For example, the NFD module 104 may determine that an external NFD module 120 of the external accelerator 118 is configured to perform the first workload request using the external accelerator 118. As yet another example, the NFD module 104 may determine that a remote NFD module 125 of the remote device 124 is configured to perform the first workload request using a remote accelerator (not illustrated in FIG. 1) of the remote device 124.

The NFD module 104 may offload, via an interface, the first workload request to the different NFD module. For example, the NFD module 104 may offload the first workload request to the external NFD module 120 via the TCP/IP overlay tunnel. As another example, the NFD module 104 may offload the first workload request to the remote NFD module 125 via the Wi-Fi interface and the Internet. The different NFD module may perform the first workload request using the corresponding accelerator.

The NFD module 104 may receive a second interest packet that includes a second workload request. The second interest packet may also be configured according to the NDN protocol. The NFD module 104 may receive the second interest packet from the external device 116 or another device (not illustrated in FIG. 1) within the LAN 101.

The NFD module 104 may determine that the first offloaded NFD module 108 is not configured to perform the second workload request. The NFD module 104 may determine that the first offloaded NFD module 108 is not configured to perform the second workload request based on the configuration table. The NFD module 104 may determine that the second offloaded NFD module 112 is configured to perform the second workload request using the second accelerator 110. The NFD module 104 may determine that the second offloaded NFD module 112 is configured to perform the second workload request based on the configuration table. The NFD module 104 may offload, via the API, the second workload request to the second offloaded NFD module 112. The second offloaded NFD module 112 may perform the second workload request using the second accelerator 110.

The NFD module 104 may provide internal telemetry data to the external device 116. The internal telemetry data may include NFD telemetry data. The external device 116 may update an external configuration table stored in the external device based on the internal telemetry data. The internal telemetry data may indicate a processing capability and a storage capability of the first accelerator 106 and the second accelerator 110. In addition, the NFD module 104 may receive external telemetry data from the external device 116. The external telemetry data may indicate a processing capability and a storage capability of the external accelerator 118.

The NFD module 104 may update the configuration table based on the external telemetry data. The configuration table (e.g., an updated configuration table) may include the internal telemetry data and the external telemetry data. The NFD module 104 may identify the external NFD module 120 as being configured to perform the first workload request or the second workload request based on the updated configuration table.

Figure 2:
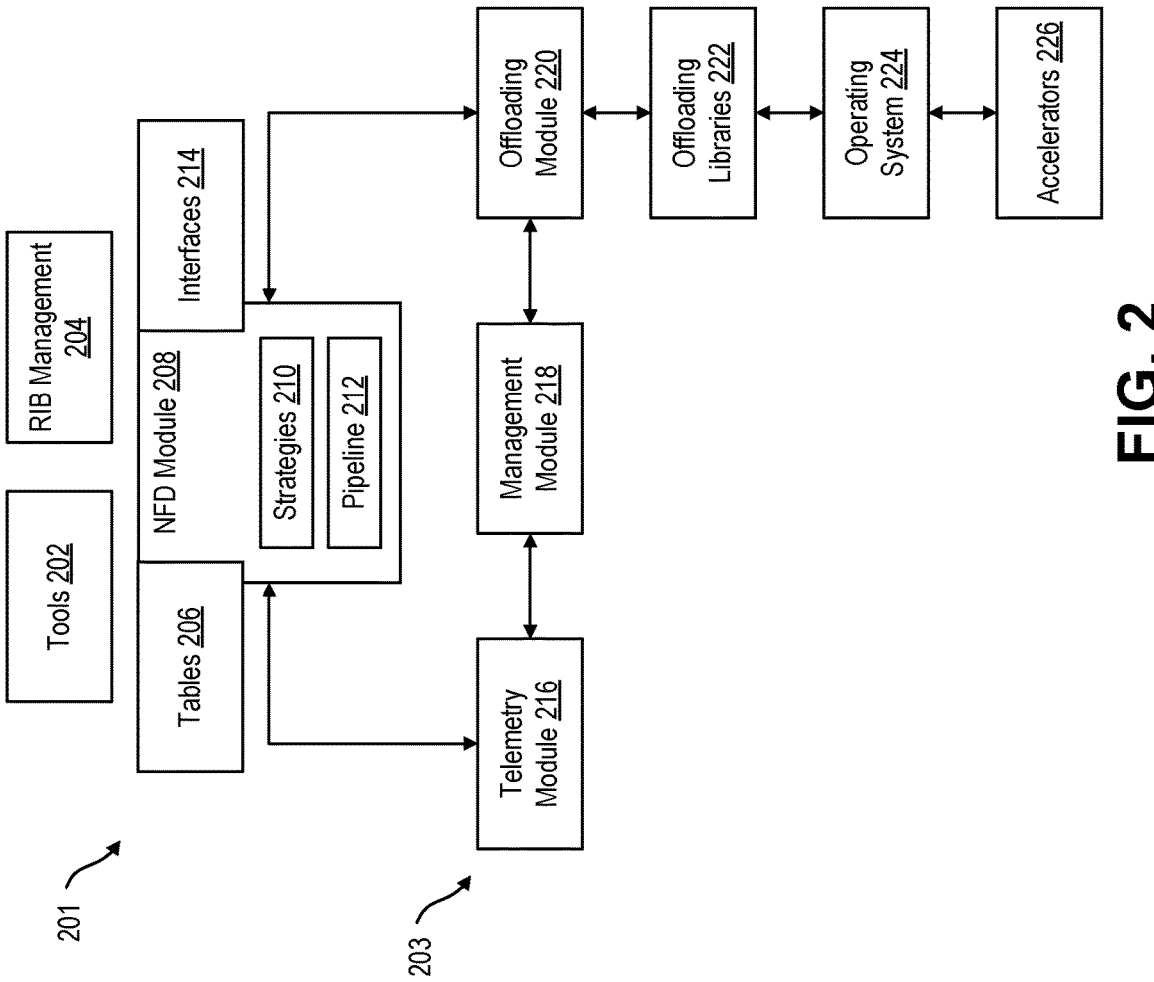
FIG. 2 illustrates a block diagram of an exemplary layer configuration that may be implemented in the core accelerator of FIG. 1.
Figure 2:

FIG. 2 illustrates a block diagram of an exemplary layer configuration 200 that may be implemented in the core accelerator 103 of FIG. 1, in accordance with at least one aspect described in the present disclosure. The layer configuration may include a first layer 201 and a second layer 203.

The first layer 201 may include an NFD module 208, which may correspond to the NFD module 104 of FIG. 1. The NFD module 208 may access tables 206, tools 202, and routing information base (RIB) management 204. The tables 206 may include the configuration table, a forwarding information base (FIB) table, a caching table, a pending interest table (PIT). The NFD module 208 may be communicatively coupled to different devices via interfaces 214. The NFD module may include strategies 210 and a pipeline 212. The strategies 210 may indicate a forwarding strategy for interest packets within the core accelerator 103. The NFD module 208 may generate the strategies 210 based on the tables 206, the interfaces 214, the tools 202, the RIB management 204, or some combination thereof. The pipeline 212 may be configured to perform functions or operations for the NFD module 208. The RIB management 204 may include routing protocols (e.g., a named-data link state routing protocol), applications for prefix registration, or some combination thereof. The tools 202 may include information associated with the API, the telemetry data, utilization information, or any other appropriate information.

The second layer 203 may include a telemetry module 216, a management module 218, and an offloading module 220. The NFD module 208 may be communicatively coupled to the telemetry module 216 and the offloading module 220. In addition, the management module 218 may be communicatively coupled to the telemetry module 216 and the offloading module 220.

The NFD module 208 may obtain the internal telemetry data from the telemetry module 216. Alternatively, the telemetry module 216 may determine the internal telemetry data based on information received from the NFD module 208. The telemetry module 216 may determine whether an update interval (e.g., a period of time) has elapsed since a most recent update of the internal telemetry data or receipt of a most recent external telemetry data. The internal telemetry data or the external telemetry data may include information about a configuration of the PIT, a configuration of the RIB, a memory, an amount of the traffic, a request to a CS module (e.g., the memory), or some combination thereof.

The management module 218 may reason over the internal telemetry data, the external telemetry data, or some combination thereof. The management module 218 may improve operation of various components associated with the NFD module 208 using the internal telemetry data, the external telemetry data, or some combination thereof.

The management module 218 may adjust a length of time associated with the update interval. For example, the management module 218 may adjust the update the length of the update interval based on whether neighboring devices (e.g., neighboring nodes or base stations) is reduced, throughput of data is reduced, a rate of transmitting the internal telemetry data is reduced, or some combination thereof.

The offloading module 220 may expose accelerators 226 to the management module 218 or the NFD module 208. The offloading module 220 may provide an API to the accelerators 226 using offloading libraries 222, an operating system (OS) 224, or some combination thereof. The offloading module 220 may permit the NFD module 208 to map the workload request to the accelerators 226 to permit the NFD module 208 to offload the workload request to the accelerators 226.

Figure 3:
FIG. 3 illustrates a block diagram of an exemplary operational environment to wirelessly transmit telemetry data between base stations.

FIG. 3 illustrates a block diagram of an exemplary operational environment 300 to wirelessly transmit telemetry data between base stations, in accordance with at least one aspect described in the present disclosure. The operational environment 300 may include a first base station/NFD module 302, a second base station/NFD module 304, and a third base station/NFD module 306. First telemetry data 308 may be transmitted between the first base station/NFD module 302 and the second base station/NFD module 304 using any appropriate wireless interface. Second telemetry data 310 may be transmitted between the second base station/NFD module 304 and the third base station/NFD module 306 using any appropriate wireless interface. Third telemetry data 312 may be transmitted between the first base station/NFD module 302 and the third base station/NFD module 306 using any appropriate wireless interface.

The first telemetry data 308 may include internal telemetry data and external telemetry data corresponding to the first base station/NFD module 302 and the second base station/NFD module 304. The second telemetry data 310 may include internal telemetry data and external telemetry data corresponding to the second base station/NFD module 304 and the third base station/NFD module 306. The third telemetry data 312 may include internal telemetry data and external telemetry data corresponding to the first base station/NFD module 302 and the third base station/NFD module 306. The third base station/NFD module 306 may include an accelerated NFD module.

Figure 4:
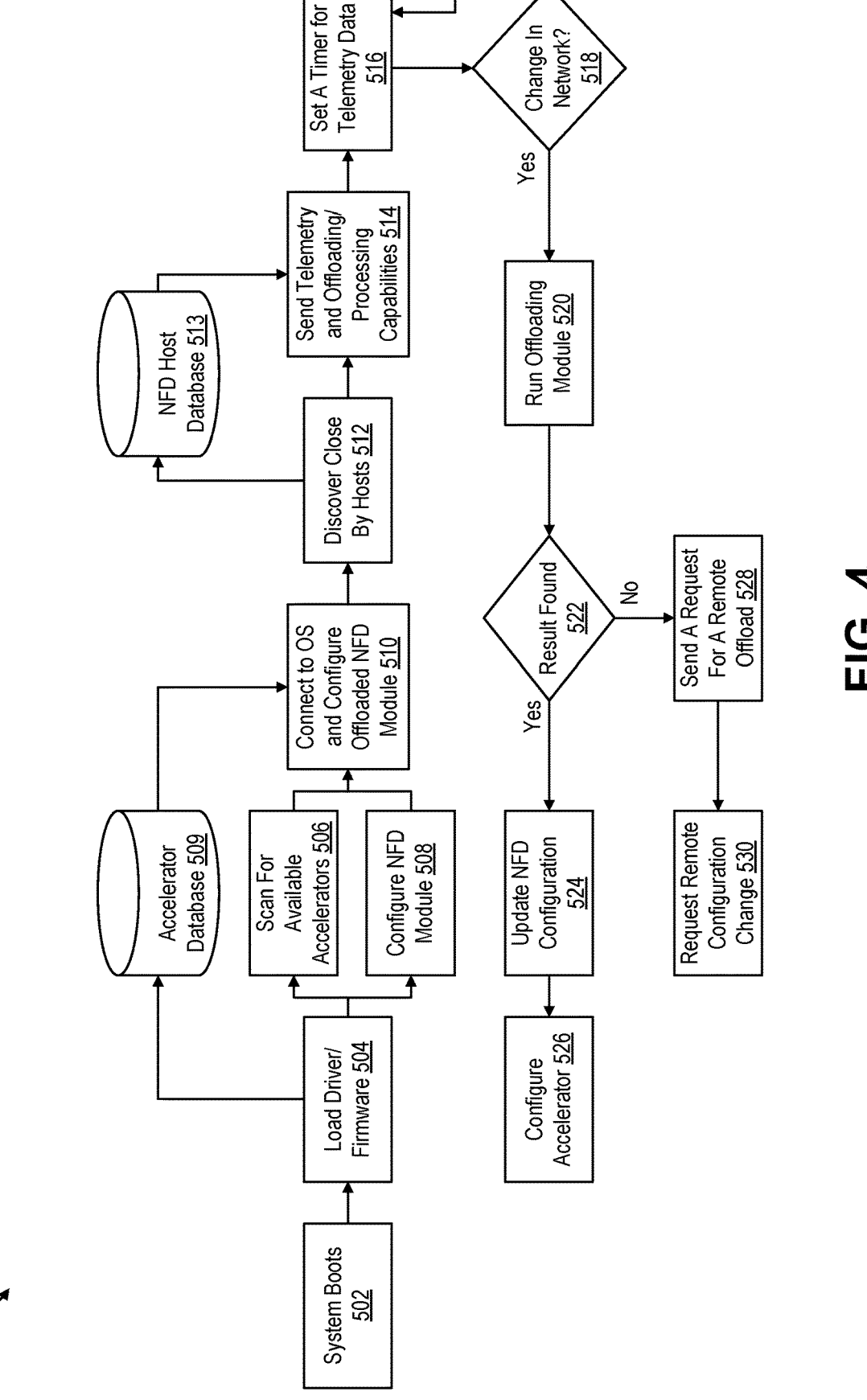
FIG. 4 illustrates a flowchart of an exemplary method to offload functions to different accelerators using an NDN protocol.

FIG. 4 illustrates a flowchart of an exemplary method to offload functions to different accelerators using the NDN protocol, in accordance with at least one aspect described in the present disclosure. The method 500 may be performed by any suitable system, apparatus, or device with respect to offloading functions to different accelerators using an NDN protocol. For example, the device 102, core accelerator 103, the NFD module 104, the first offloaded NFD module 108, the first accelerator 106, the external NFD module 120, the telemetry module 216, the offloading module 220, or some combination thereof of FIGS. 1 and 2 may perform or direct performance of one or more of the operations associated with the method 500. The method 500 is described in relation to FIG. 4 as being performed by the device 102, the core accelerator 103, the NFD module 104, the first offloaded NFD module 108, the first accelerator 106, the telemetry module 216, the offloading module 220, and the external NFD module 120 for example purposes. The method 500 may include one or more blocks 502, 504, 506, 508, 510, 512, 514, 516, 518, 520, 522, 524, 526, 528, and 530. Although illustrated with discrete blocks, the operations associated with one or more of the blocks of the method 500 may be divided into additional blocks, combined into fewer blocks, or eliminated, depending on the particular implementation.

At block 502, the system may boot. For example, the device 102 and the LAN 101 may go through a startup phase. Block 502 may be followed by block 504. At block 504, the device 102 may load drivers and firmware on the core processor 103, the first accelerator 106, or some combination thereof. The device 102 may load firmware to initialize the core accelerator 103, the interfaces, and any other appropriate hardware and software within the device 102. In addition, the device 102 may generate an accelerator database 509. The accelerator database 509 may include the configuration table, the internal telemetry data, the external telemetry data, or some combination thereof. Block 504 may be followed by block 506 and 508.

At block 506, the device 102 may scan for available accelerators. For example, the device 102 may scan for the core accelerator 103, the first accelerator 106, and the second accelerator 110, or some combination thereof. Block 506 may be followed by block 510. At block 508, the device 102 may configure the NFD module 104 in the core processor 103. For example, the device 102 may load firmware on the core processor 103 to configure the NFD module 104. Block 508 may be followed by block 510.

At block 510, the NFD module 104 may connect to an OS and configure an offloaded NFD module 510. For example, the NFD module 104 may configure the first offloaded NFD module 108 in the first accelerator 106. The NFD module 104 may configure the first offloaded NFD module 108 using the accelerator database. The NFD module 108 may configure functions that the first accelerator 106 is configured to perform. The NFD module 108 may configure the first accelerator 106 using OS functions. Block 510 may be followed by block 512.

At block 512, the NFD module 104 may discover nearby hosts. For example the NFD module 104 may discover the external device 116 as being within a proximity of the device 102. The NFD module 104 may discover other devices within the LAN 101. The NFD module 104 may generate an NFD host database 513 that identifies the external device 116 and includes the internal telemetry data, the external telemetry data, or some combination thereof. Block 512 may be followed by block 514.

At block 514, the NFD module 104 may send telemetry and offloading/processing capabilities to the external device 116. The NFD module 104 may cause the telemetry module 216 to provide the internal telemetry data indicating the telemetry data and the offloading and processing capabilities of the first accelerator 106 to the external device 116. For example, the telemetry module 216 may provide the NFD host database 513 to the external device 116. Block 514 may be followed by block 516. At block 516, the NFD module 104 may set a timer for the telemetry data. For example, the NFD module 104 may instruct the telemetry module 216 to set a timer equal to the update interval. Block 516 may be followed by block 518.

At block 518, the NFD module 104 may determine whether there is a change in the network. The change in the network may include an interest packet being received by the device 102. The interest packet may include a workload request that the NFD module 104 determines a setting is not achievable using the core processor 103. For example, the NFD module 104 may determine a throughput setting of the workload request is not achievable using the core processor 103. As another example, the NFD module 104 may determine a cache setting of the workload request is not achievable using the core processor 103. If a change in the network has not occurred, block 518 may be followed by block 516. Therefore, each time the update interval elapses without a change in the network occurring, the NFD module 104 may send the internal telemetry data to the external device 116. If a change in the network has occurred, block 518 may be followed by block 520.

At block 520, the NFD module may run the offloading module 220. The offloading module may reason over possible configurations and offloading configurations using the configuration table to make the setting of the workload request achievable. Block 520 may be followed by block 522.

At block 522, the NFD module 104 may determine whether a result is found. For example, the NFD module 104 may determine whether the first offloaded NFD module is configured to perform the workload request. If the NFD module 104 finds a result, block 522 may be followed by block 524. If the NFD module 104 does not find a result, block 522 may be followed by block 528.

At block 524, the NFD module 104 may update an NFD configuration. For example, the NFD module 104 may update the configuration table to indicate that the first offloaded NFD module 108 is configured to perform the workload request. Block 524 may be followed by block 526. At block 526, the NFD module 104 may configure the first accelerator 106 to perform the workload request. The first offloaded NFD module 108 may perform the workload request using the first accelerator 106.

At block 528, the NFD module 104 may send a request for a remote offload. For example, the NFD module 104 may send a request for a remote offload to the external NFD module 120 or the remote NFD module 125. Block 518 may be followed by block 530. At block 530, the NFD module 104 may request a remote configuration change. The NFD module 104 may send a message to the external device 116 or the remote device 124 requesting an update to the external telemetry data. The external NFD module 102 or the remote NFD module 125 may perform the workload request using the corresponding accelerators.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

FIG. 5 illustrates a flowchart of an exemplary method 600 to offload functions to different accelerators using the NDN protocol, in accordance with at least one aspect described in the present disclosure. The method 600 may be performed by any suitable system, apparatus, or device with respect to offloading functions to different accelerators using the NDN protocol. For example, the device 102, the NFD module 104, or some combination thereof of FIG. 1 may perform or direct performance of one or more of the operations associated with the method 600. The method 600 is described in relation to FIG. 5 as being performed by the NFD module 104 for example purposes The method 600 may include one or more blocks 602, 604, 606, 608, and 610. Although illustrated with discrete blocks, the operations associated with one or more of the blocks of the method 600 may be divided into additional blocks, combined into fewer blocks, or eliminated, depending on the particular implementation.

At block 602, the NFD module 104 may identify an accelerator of a plurality of accelerators on which to configure an offloaded NFD module based on a configuration table indicating a current configuration of the plurality of accelerators. At block 604, the NFD module 104 may configure the offloaded NFD module on the identified accelerator. At block 606, the NFD module 104 may receive an interest packet including a workload request, the interest packet configured according to an NDN protocol. At block 608, the NFD module 104 may determine that the offloaded NFD module is configured to perform the workload request using the identified accelerator based on the configuration table. At block 610, the NFD module may offload, via an application programming interface, the workload request to the offloaded NFD module to perform the workload request using the identified accelerator.

Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

One or more aspect described in the present disclosure may include an NFD module within a core processer. The NFD module may be configured to offload a workload request to other accelerators based on capabilities of the core accelerator, the other accelerators, or some combination thereof. The NFD module may offload the workload request to a first accelerator or a second accelerator using an API. The other accelerators may perform the offloaded workload request, which may increase efficiency of the device compared the core accelerator always performing the workload request. Alternatively, the NFD module may offload the workload request to an external accelerator or a remote NFD module using a different interface.

The NFD module may offload the workload request to another accelerator within the device via the API, which may permit offloading of multiple functions and a data processing pipeline. The NFD module may be configured within the core accelerator. The core accelerator and the other accelerators may include an xPU, a FPGA, an ASICS, a GPU, or a CPU.

The NFD module may understand underlying hardware capabilities of the accelerators such as a caching content, an interest forwarding, and a name resolution. The NFD module may run as an application on the core processor or may be offloaded to the other accelerators.

The NFD module may include or be communicatively coupled to an offloading module and a telemetry module. The offloading module may expose the accelerator to a management layer according to the NDN protocol. The offloading module may map computation settings of the accelerators. In addition, the offloading module may change the configuration of the device.

The telemetry module may determine internal telemetry data and may cause the device to provide the internal telemetry data to the external device. The internal telemetry data may include information about a PIT, a RIB, a CS stores, an amount of traffic, and a request to a CS module. The telemetry module may cause the internal telemetry data to be provided after an update interval period elapses. The management module may update the length of time of the update interval based on a number of near neighboring devices, a throughput rate of data, a rate of receiving the external telemetry data, or some combination thereof.

The management module may reason over data collected by the telemetry module. The CS module may include a descriptor of a high number of packets. The management module may identify a dataset based on the descriptors.

During a system boot-up, a NIC/a Smart NIC/a modem driver and firmware may be loaded on components (e.g., accelerators and interfaces) within the device. The accelerators may start in an empty state and the core accelerator may be configured with the NFD module. The NFD module may scan for available accelerators within the device. The NFD module may configure accelerator functions and offloaded NFD modules on the accelerators through OS functions. The NFD module may discover close by devices (e.g., base station). The NFD module may send information to the discovered devices with information about processing and storage capabilities and telemetry information associated with the accelerators within the device. The telemetry module may set the timer for the update interval.

The NFD module may determine if there is a change in network behavior that does not allow settings to be achieved using the core processor. For example, a throughput setting may not be achievable or a disk may not allow packet caching. The offloading module may reason over configurations and offloading configurations to permit the settings to be achieved. If the offloading module does not identify an offloading configuration, the NFD module may send a request for a remote offload to route packets through other NFD modules of external devices.

A device may include a processor. The processor may include an NFD module. The device may also include a memory storing instructions on which, when executed by the processor, configure the processor. The processer may initialize interfaces of the device. The interfaces may include at least one of a PCI-E interface, a TCP/IP overlay tunnel, an IPC interface, an Ethernet interface, a wireless fidelity interface, and a modem interface.

The NFD module may identify a first accelerator within the device on which to configure a first offloaded NFD module. The first accelerator may include an xPU, a FPGA, an ASIC, a GPU, and a CPU. The NFD module may identify a first accelerator based on a configuration table that indicates a current configuration of accelerators within the device. The configuration table may indicate at least one of a memory speed, a specialized hardware capability, a cache use, a high-speed link interface, a cache content, an interest forwarding, a compute capability, and a name resolution of each accelerator within the device.

The NFD module may configure the first offloaded NFD module on the first accelerator. The NFD module may configure the first offloaded NFD module to perform a first offloaded function of the NFD module. The NFD module may receive a first interest packet that includes a first workload request. The interest packet may be configured according to the NDN protocol.

The NFD module may determine that the first offloaded NFD module is configured to perform the first workload request using the first accelerator. The NFD module may determine that the first offloaded NFD module is configured to perform the first workload request by determining that the first workload request corresponds to the first offloaded function of the NFD module. The NFD module may offload, via the API, the first workload request to the first offloaded NFD module to perform the first workload request using the first accelerator.

The NFD module may identify a second accelerator within the device on which to configure a second offloaded NFD module based on the configuration table. The NFD module may configure the second offloaded NFD module on the second accelerator. The NFD module may update the configuration table based on the second accelerator and the second offloaded NFD module.

The NFD module may receive a second interest packet that includes a second workload request. The NFD module may determine that the second offloaded NFD module is configured to perform the second workload request using the second accelerator based on the updated configuration table. The first accelerator may include a first segment of an accelerator and the second accelerator may include a second segment of the same accelerator. Alternatively, the first accelerator and the second accelerator may include different accelerators. The NFD module may offload, via the API, the second workload request to the second offloaded NFD module. The second offloaded NFD module may perform the second workload request using the second accelerator.

The processor of the device may initialize the first accelerator, the second accelerator, or some combination thereof. In addition, the processor of the device may configure the NFD module within the processor. The NFD module may include the configuration table.

The NFD module may provide internal telemetry data to an external device. The internal telemetry data may indicate a processing capability, a storage capability, or some combination of the first accelerator and the second accelerator. The internal telemetry data may include data indicating at least one of a PIT, a RIB, a CS, an amount of traffic, and a request to the CS corresponding to the first accelerator and the second accelerator. The NFD module may receive external telemetry data from the external device. The external telemetry data may indicate a processing capability and a storage capability of an external accelerator that includes an external NFD module within the external device.

The NFD module may identify the external accelerator based on the external telemetry data. The NFD module may update the configuration table based on the external telemetry data. The updated configuration table may include the internal telemetry data and the external telemetry data.

The NFD module may receive a second interest packet including a second workload request. The second interest packet may be configured according to the NDN protocol. The NFD module may identify the external NFD module of the external accelerator within the external device as being configured to perform the second workload request based on the updated configuration table. The NFD module may offload the second workload request to the external NFD module to perform the second workload request using the external accelerator.

A device may include a processor that includes an NFD module. The NFD module may identify a first accelerator within the device on which to configure a first offloaded NFD module based on a configuration table. The configuration table may indicate a current configuration of accelerators within the device. The NFD module may configure the first offloaded NFD module on the first accelerator.

The NFD module may receive an interest packet that includes a workload request. The interest packet may be configured according to an NDN protocol. The NFD module may determine that the first offloaded NFD module is not configured to perform the workload request using the first accelerator based on the configuration table. The NFD module may determine that a different NFD module is configured to perform the workload request using a corresponding accelerator based on the configuration table. The NFD module may offload, via an interface, the workload request to the different NFD module to perform the workload request using the corresponding accelerator.

The NFD module may identify a second accelerator within the device on which to configure a second offloaded NFD module based on the configuration table. The NFD module may configure the second offloaded NFD module on the second identified accelerator. The NFD module may update the configuration table based on the second identified accelerator and the second offloaded NFD module. The NFD module may determine that the second offloaded NFD module is configured to perform the workload request using the second identified accelerator based on the updated configuration table. The second offloaded NFD module may include the different NFD module and the interface may include an API. The NFD module may offload, via the API, the workload request to the second offloaded NFD module to perform the workload request using the second accelerator.

The NFD module may determine that an external NFD module of an external accelerator within the external device is configured to perform the workload request. The NFD module may offload the workload request to the external NFD module to perform the workload request using the external accelerator. The external NFD module may include the different NFD module.

The NFD module may provide internal telemetry data to the external device. The internal telemetry data may indicate a processing capability and a storage capability of the first accelerator. The internal telemetry data may include data indicating at least one of a PIT, a RIB, a CS, an amount of traffic, and a request to the CS corresponding to the first accelerator, the second accelerator, or some combination thereof. The NFD module may receive external telemetry data from the external device. The external telemetry data may indicate a processing capability and a storage capability of the external accelerator that includes the external NFD module within the external device. The NFD module may identify the external accelerator based on the external telemetry data.

The NFD module may update the configuration table based on the external telemetry data. The updated configuration table may include the internal telemetry data and the external telemetry data. The NFD module may identify the external NFD module of the external accelerator as being configured to perform the workload request based on the updated configuration table. The external NFD module may include the different NFD module.

Example 1 may include a device including a processor including an NFD module configured to identify an accelerator of a plurality of accelerators within the device on which to configure an offloaded NFD module based on a configuration table indicating a current configuration of the plurality of accelerators; configure the offloaded NFD module on the identified accelerator; receive an interest packet including a workload request, the interest packet configured according to an NDN protocol; determine that the offloaded NFD module is configured to perform the workload request using the identified accelerator based on the configuration table; and offload, via an application programming interface, the workload request to the offloaded NFD module to perform the workload request using the identified accelerator.

Example 2 may include the device of example 1, wherein the configuration table indicates at least one of a memory speed, a specialized hardware capability, a cache use, a high-speed link interface, a cache content, an interest forwarding, a compute capability, and a name resolution of each accelerator of the plurality of accelerators.

Example 3 may include the device of example 1, wherein: the NFD module is further configured to configure the offloaded NFD module to perform an offloaded function of the NFD module; and the NFD module is configured to determine that the offloaded NFD module is configured to perform the workload request by determining that the workload request corresponds to the offloaded function of the NFD module.

Example 4 may include the device of example 1, wherein the processor is configured to: initialize the plurality of accelerators; and configure the NFD module within the processor, the NFD module including the configuration table.

Example 5 may include the device of example 1, wherein the NFD module is further configured to: provide internal telemetry data to an external device, the internal telemetry data indicating a processing capability and a storage capability of each accelerator of the plurality of accelerators; receive external telemetry data from the external device, the external telemetry data indicating a processing capability and a storage capability of an external accelerator including an external NFD module within the external device; and update the configuration table based on the external telemetry data, the updated configuration table including the internal telemetry data and the external telemetry data.

Example 6 may include the device of example 5, wherein: the NFD module is further configured to identify the external accelerator based on the external telemetry data; and the internal telemetry data includes data indicating at least one of a pending interest table, a routing information base, a content store, an amount of traffic, and a request to the content store corresponding to the plurality of accelerators.

Example 7 may include the device of example 5, wherein the interest packet includes a first interest packet, the workload request includes a first workload request, the offloaded NFD module includes a first offloaded NFD module, and the identified accelerator includes a first identified accelerator, the NFD module is further configured to: receive a second interest packet including a second workload request, the second interest packet configured according to the NDN protocol; identify the external NFD module of the external accelerator within the external device as being configured to perform the second workload request based on the updated configuration table; and offload the second workload request to the external NFD module to perform the second workload request using the external accelerator.

Example 8 may include the device of example 1, wherein the interest packet includes a first interest packet, the workload request includes a first workload request, the offloaded NFD module includes a first offloaded NFD module, and the identified accelerator includes a first identified accelerator, the NFD module is further configured to: identify a second accelerator of the plurality of accelerators within the device on which to configure a second offloaded NFD module based on the configuration table; configure the second offloaded NFD module on the second identified accelerator; update the configuration table based on the second identified accelerator and the second offloaded NFD module; receive a second interest packet including a second workload request; determine that the second offloaded NFD module is configured to perform the second workload request using the second identified accelerator based on the updated configuration table; and offload, via the application programming interface, the second workload request to the second offloaded NFD module to perform the second workload request using the second identified accelerator.

Example 9 may include the device of example 1, wherein the plurality of accelerators include at least two of a cross-architecture processing unit, a field programmable gate array, an application-specific integrated circuit, a general processing unit, and a centralized processing unit.

Example 10 may include the device of example 1, wherein the processor is configured to initialize a plurality of interfaces including at least one of a peripheral component interconnect express interface, a transmission control protocol/Internet protocol overlay tunnel, an inter-process communication interface, an Ethernet interface, and a wireless fidelity interface.

Example 11 may include the device of example 1, further including: a memory storing instructions on which, when executed by the processor, configure the processor.

Example 12 may include a device including a processor including an NFD module configured to: identify an accelerator of a plurality of accelerators within the device on which to configure an offloaded NFD module based on a configuration table indicating a current configuration of the plurality of accelerators; configure the offloaded NFD module on the identified accelerator; receive an interest packet including a workload request, the interest packet configured according to an NDN protocol; determine that the offloaded NFD module is not configured to perform the workload request using the identified accelerator based on the configuration table; determine that a different NFD module is configured to perform the workload request using a corresponding accelerator based on the configuration table; and offload, via an interface, the workload request to the different NFD module to perform the workload request using the corresponding accelerator.

Example 13 may include the device of example 12, wherein the offloaded NFD module includes a first offloaded NFD module and the identified accelerator includes a first identified accelerator, the NFD module is further configured to: identify a second accelerator of the plurality of accelerators within the device on which to configure a second offloaded NFD module based on the configuration table; configure the second offloaded NFD module on the second identified accelerator; update the configuration table based on the second identified accelerator and the second offloaded NFD module; and determine that the second offloaded NFD module is configured to perform the workload request using the second identified accelerator based on the updated configuration table, wherein the second offloaded NFD module includes the different NFD module and the interface includes an application programming interface.

Example 14 may include the device of example 12, wherein the NFD module is further configured to: provide internal telemetry data to an external device, the internal telemetry data indicating a processing capability and a storage capability of each accelerator of the plurality of accelerators; receive external telemetry data from the external device, the external telemetry data indicating a processing capability and a storage capability of an external accelerator including an external NFD module within the external device; and update the configuration table based on the external telemetry data, the updated configuration table including the internal telemetry data and the external telemetry data.

Example 15 may include the device of example 14, wherein: the NFD module is further configured to identify the external accelerator based on the external telemetry data; and the internal telemetry data includes data indicating at least one of a pending interest table, a routing information base, a content store, an amount of traffic, and a request to the content store corresponding to the plurality of accelerators.

Example 16 may include the device of example 14, wherein the NFD module is further configured to: identify the external NFD module of the external accelerator within the external device as being configured to perform the workload request based on the updated configuration table, wherein the external NFD module includes the different NFD module.

Example 17 may include the device of example 12, further including: a memory storing instructions on which, when executed by the processor, configure the processor.

Example 18 may include a non-transitory computer-readable medium having a memory having computer-readable instructions stored thereon and a processor operatively coupled to the memory and configured to read and execute the computer-readable instructions to perform or control performance of operations including: identifying an accelerator of a plurality of accelerators on which to configure an offloaded NFD module based on a configuration table indicating a current configuration of the plurality of accelerators; configuring the offloaded NFD module on the identified accelerator; receiving an interest packet including a workload request, the interest packet configured according to an NDN protocol; determining that the offloaded NFD module is configured to perform the workload request using the identified accelerator based on the configuration table; and offloading, via an application programming interface, the workload request to the offloaded NFD module to perform the workload request using the identified accelerator.

Example 19 may include the non-transitory computer-readable medium of example 18, wherein the configuration table indicates at least one of a memory speed, a specialized hardware capability, a cache use, a high-speed link interface, a cache content, an interest forwarding, a compute capability, and a name resolution of each accelerator of the plurality of accelerators.

Example 20 may include the non-transitory computer-readable medium of example 18, wherein: the offloaded NFD module is configured to perform an offloaded function of an NFD module; and the operations further include determining that the offloaded NFD module is configured to perform the workload request by determining that the workload request corresponds to the offloaded function of the NFD module.

Example 21 may include the non-transitory computer-readable medium of example 18, the operations further including: initializing the plurality of accelerators; and configuring an NFD module within the processor, the NFD module including the configuration table.

Example 22 may include the non-transitory computer-readable medium of example 18, the operations further including: providing internal telemetry data to an external device, the internal telemetry data indicating a processing capability and a storage capability of each accelerator of the plurality of accelerators; receiving external telemetry data from the external device, the external telemetry data indicating a processing capability and a storage capability of an external accelerator including an external NFD module within the external device; and updating the configuration table based on the external telemetry data, the updated configuration table including the internal telemetry data and the external telemetry data.

Example 23 may include the non-transitory computer-readable medium of example 22, wherein: the operations further include identifying the external accelerator based on the external telemetry data; and the internal telemetry data includes data indicating at least one of a pending interest table, a routing information base, a content store, an amount of traffic, and a request to the content store corresponding to the plurality of accelerators.

Example 24 may include the non-transitory computer-readable medium of example 22, wherein the interest packet includes a first interest packet, the workload request includes a first workload request, the offloaded NFD module includes a first offloaded NFD module, and the identified accelerator includes a first identified accelerator, the operations further including: receiving a second interest packet including a second workload request, the second interest packet configured according to the NDN protocol; identifying the external NFD module of the external accelerator within the external device as being configured to perform the second workload request based on the updated configuration table; and offloading the second workload request to the external NFD module to perform the second workload request using the external accelerator.

Example 25 may include the non-transitory computer-readable medium of example 18, wherein the interest packet includes a first interest packet, the workload request includes a first workload request, the offloaded NFD module includes a first offloaded NFD module, and the identified accelerator includes a first identified accelerator, the operations further including: identifying a second accelerator of the plurality of accelerators on which to configure a second offloaded NFD module based on the configuration table; configuring the second offloaded NFD module on the second identified accelerator; updating the configuration table based on the second identified accelerator and the second offloaded NFD module; receiving a second interest packet including a second workload request; determining that the second offloaded NFD module is configured to perform the second workload request using the second identified accelerator based on the updated configuration table; and offloading, via the application programming interface, the second workload request to the second offloaded NFD module to perform the second workload request using the second identified accelerator.

Example 26 may include the non-transitory computer-readable medium of example 18, wherein the plurality of accelerators include at least two of a cross-architecture processing unit, a field programmable gate array, an application-specific integrated circuit, a general processing unit, and a centralized processing unit.

Example 27 may include the non-transitory computer-readable medium of example 18, the operations further include initializing a plurality of interfaces including at least one of a peripheral component interconnect express interface, a transmission control protocol/Internet protocol overlay tunnel, an inter-process communication interface, an Ethernet interface, and a wireless fidelity interface.

Example 28 may include a non-transitory computer-readable medium having a memory having computer-readable instructions stored thereon and a processor operatively coupled to the memory and configured to read and execute the computer-readable instructions to perform or control performance of operations including: identifying an accelerator of a plurality of accelerators on which to configure an offloaded NFD module based on a configuration table indicating a current configuration of the plurality of accelerators; configuring the offloaded NFD module on the identified accelerator; receiving an interest packet including a workload request, the interest packet configured according to an NDN protocol; determining that the offloaded NFD module is not configured to perform the workload request using the identified accelerator based on the configuration table; determining that a different NFD module is configured to perform the workload request using a corresponding accelerator based on the configuration table; and offloading, via an interface, the workload request to the different NFD module to perform the workload request using the corresponding accelerator.

Example 29 may include the non-transitory computer-readable medium of example 28, wherein the offloaded NFD module includes a first offloaded NFD module and the identified accelerator includes a first identified accelerator, the operations further including: identifying a second accelerator of the plurality of accelerators on which to configure a second offloaded NFD module based on the configuration table; configuring the second offloaded NFD module on the second identified accelerator; updating the configuration table based on the second identified accelerator and the second offloaded NFD module; and determining that the second offloaded NFD module is configured to perform the workload request using the second identified accelerator based on the updated configuration table, wherein the second offloaded NFD module includes the different NFD module and the interface includes an application programming interface.

Example 30 may include the non-transitory computer-readable medium of example 28, the operations further including: providing internal telemetry data to an external device, the internal telemetry data indicating a processing capability and a storage capability of each accelerator of the plurality of accelerators; receiving external telemetry data from the external device, the external telemetry data indicating a processing capability and a storage capability of an external accelerator including an external NFD module within the external device; and updating the configuration table based on the external telemetry data, the updated configuration table including the internal telemetry data and the external telemetry data.

Example 31 may include the non-transitory computer-readable medium of example 30, wherein: the operations further include identifying the external accelerator based on the external telemetry data; and the internal telemetry data includes data indicating at least one of a pending interest table, a routing information base, a content store, an amount of traffic, and a request to the content store corresponding to the plurality of accelerators.

Example 32 may include the non-transitory computer-readable medium of example 30, the operations further including identifying the external NFD module of the external accelerator within the external device as being configured to perform the workload request based on the updated configuration table, wherein the external NFD module includes the different NFD module.

Example 33 may include a system including: means to identify an accelerator of a plurality of accelerators on which to configure an offloaded NFD module based on a configuration table indicating a current configuration of the plurality of accelerators; means to configure the offloaded NFD module on the identified accelerator; means to receive an interest packet including a workload request, the interest packet configured according to an NDN protocol; means to determine that the offloaded NFD module is configured to perform the workload request using the identified accelerator based on the configuration table; and means to offload, via an application programming interface, the workload request to the offloaded NFD module to perform the workload request using the identified accelerator.

Example 34 may include the system of example 33, wherein: the system further includes means to initialize the plurality of accelerators; and configure the NFD module within the processor, the NFD module including the configuration table.

Example 35 may include the system of example 33 further including: means to provide internal telemetry data to an external device, the internal telemetry data indicating a processing capability and a storage capability of each accelerator of the plurality of accelerators; means to receive external telemetry data from the external device, the external telemetry data indicating a processing capability and a storage capability of an external accelerator including an external NFD module within the external device; and means to update the configuration table based on the external telemetry data, the updated configuration table including the internal telemetry data and the external telemetry data.

Example 36 may include the system of example 35, wherein the interest packet includes a first interest packet, the workload request includes a first workload request, the offloaded NFD module includes a first offloaded NFD module, and the identified accelerator includes a first identified accelerator, the system further including: means to receive a second interest packet including a second workload request, the second interest packet configured according to the NDN protocol; means to identify the external NFD module of the external accelerator within the external device as being configured to perform the second workload request based on the updated configuration table; and means to offload the second workload request to the external NFD module to perform the second workload request using the external accelerator.

Example 37 may include the system of example 33, wherein the interest packet includes a first interest packet, the workload request includes a first workload request, the offloaded NFD module includes a first offloaded NFD module, and the identified accelerator includes a first identified accelerator, the system further including: means to identify a second accelerator of the plurality of accelerators on which to configure a second offloaded NFD module based on the configuration table; means to configure the second offloaded NFD module on the second identified accelerator; means to update the configuration table based on the second identified accelerator and the second offloaded NFD module; means to receive a second interest packet including a second workload request; means to determine that the second offloaded NFD module is configured to perform the second workload request using the second identified accelerator based on the updated configuration table; and means to offload, via the application programming interface, the second workload request to the second offloaded NFD module to perform the second workload request using the second identified accelerator.

Example 38 may include a system including: means to identify an accelerator of a plurality of accelerators on which to configure an offloaded NFD module based on a configuration table indicating a current configuration of the plurality of accelerators; means to configure the offloaded NFD module on the identified accelerator; means to receive an interest packet including a workload request, the interest packet configured according to an NDN protocol; means to determine that the offloaded NFD module is not configured to perform the workload request using the identified accelerator based on the configuration table; means to determine that a different NFD module is configured to perform the workload request using a corresponding accelerator based on the configuration table; and means to offload, via an interface, the workload request to the different NFD module to perform the workload request using the corresponding accelerator.

Example 39 may include the device of example 38, wherein the offloaded NFD module includes a first offloaded NFD module and the identified accelerator includes a first identified accelerator, the system further including: means to identify a second accelerator of the plurality of accelerators within the device on which to configure a second offloaded NFD module based on the configuration table; means to configure the second offloaded NFD module on the second identified accelerator; means to update the configuration table based on the second identified accelerator and the second offloaded NFD module; and means to determine that the second offloaded NFD module is configured to perform the workload request using the second identified accelerator based on the updated configuration table, wherein the second offloaded NFD module includes the different NFD module and the interface includes an application programming interface.

Example 40 may include the system of example 38 further including: means to provide internal telemetry data to an external device, the internal telemetry data indicating a processing capability and a storage capability of each accelerator of the plurality of accelerators; means to receive external telemetry data from the external device, the external telemetry data indicating a processing capability and a storage capability of an external accelerator including an external NFD module within the external device; and means to update the configuration table based on the external telemetry data, the updated configuration table including the internal telemetry data and the external telemetry data.

Example 41 may include the system of example 40 further including means to identify the external NFD module of the external accelerator within the external device as being configured to perform the workload request based on the updated configuration table, wherein the external NFD module includes the different NFD module.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to aspects containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although aspects of the present disclosure have been described in detail, various changes, substitutions, and alterations could be made hereto without departing from the spirit and scope of the present disclosure.

The invention claimed is:

1. A device comprising a processor comprising a named data network (NDN) forwarding daemon (NFD) module configured to:

identify an accelerator of a plurality of accelerators on which to configure an offloaded NFD module based on a configuration table indicating a current configuration of the plurality of accelerators;

configure the offloaded NFD module on the identified accelerator;

receive an interest packet comprising a workload request, the interest packet configured according to an NDN protocol;

determine that the offloaded NFD module is configured to perform the workload request using the identified accelerator based on the configuration table; and offload, via an application programming interface, the workload request to the offloaded NFD module to perform the workload request using the identified accelerator.

2. The device of claim 1, wherein the NFD module is further configured to configure the offloaded NFD module to perform an offloaded function of the NFD module; and wherein the NFD module is configured to determine that the offloaded NFD module is configured to perform the workload request by determining that the workload request corresponds to the offloaded function of the NFD module.

3. The device of claim 1, wherein the NFD module is further configured to:

provide internal telemetry data to an external device, the internal telemetry data indicating a processing capability and a storage capability of each accelerator of the plurality of accelerators;

receive external telemetry data from the external device, the external telemetry data indicating a processing capability and a storage capability of an external accelerator comprising an external NFD module within the external device; and update the configuration table based on the external telemetry data, the updated configuration table comprising the internal telemetry data and the external telemetry data.

4. The device of claim 3, wherein the NFD module is further configured to identify the external accelerator based on the external telemetry data; and the internal telemetry data includes data indicating at least one of a pending interest table, a routing information base, a content store, an amount of traffic, and a request to the content store corresponding to the plurality of accelerators.

5. The device of claim 3, wherein the interest packet comprises a first interest packet, the workload request comprises a first workload request, the offloaded NFD module comprises a first offloaded NFD module, and the identified accelerator comprises a first identified accelerator, the NFD module is further configured to:

receive a second interest packet comprising a second workload request, the second interest packet configured according to the NDN protocol;

identify the external NFD module of the external accelerator within the external device as being configured to perform the second workload request based on the updated configuration table; and offload the second workload request to the external NFD module to perform the second workload request using the external accelerator.

6. The device of claim 1, wherein the interest packet comprises a first interest packet, the workload request comprises a first workload request, the offloaded NFD module comprises a first offloaded NFD module, and the identified accelerator comprises a first identified accelerator, the NFD module is further configured to:

identify a second accelerator of the plurality of accelerators on which to configure a second offloaded NFD module based on the configuration table;

configure the second offloaded NFD module on the second identified accelerator;

update the configuration table based on the second identified accelerator and the second offloaded NFD module;

receive a second interest packet comprising a second workload request;

determine that the second offloaded NFD module is configured to perform the second workload request using the second identified accelerator based on the updated configuration table; and offload, via the application programming interface, the second workload request to the second offloaded NFD module to perform the second workload request using the second identified accelerator.

7. The device of claim 1, wherein the plurality of accelerators comprises at least two of a cross-architecture processing unit, a field programmable gate array, an application-specific integrated circuit, a general processing unit, and a centralized processing unit.

8. The device of claim 1, wherein the processor is configured to initialize a plurality of interfaces including at least one of a peripheral component interconnect express interface, a transmission control protocol/Internet protocol overlay tunnel, an inter-process communication interface, an Ethernet interface, and a wireless fidelity interface.

9. A non-transitory computer-readable medium having a memory having computer-readable instructions stored thereon which when executed by a processor operatively coupled to the memory is configured to perform:

identifying an accelerator of a plurality of accelerators on which to configure an offloaded named data network (NDN) forwarding daemon (NFD) module based on a configuration table indicating a current configuration of the plurality of accelerators;

configuring the offloaded NFD module on the identified accelerator;

receiving an interest packet comprising a workload request, the interest packet configured according to an NDN protocol;

determining that the offloaded NED module is configured to perform the workload request using the identified accelerator based on the configuration table; and offloading, via an application programming interface, the workload request to the offloaded NFD module to perform the workload request using the identified accelerator.

10. The non-transitory computer-readable medium of claim 9, wherein the configuration table indicates at least one of a memory speed, a specialized hardware capability, a cache use, a link interface, a cache content, an interest forwarding, a compute capability, and a name resolution of each accelerator of the plurality of accelerators.

11. The non-transitory computer-readable medium of claim 9, wherein:

the offloaded NFD module is configured to perform an offloaded function of an NFD module; and the operations further comprise determining that the offloaded NFD module is configured to perform the workload request by determining that the workload request corresponds to the offloaded function of the NFD module.

12. The non-transitory computer-readable medium of claim 9, the operations further comprising:

initializing the plurality of accelerators; and configuring an NFD module within the processor, the NFD module comprising the configuration table.

13. The non-transitory computer-readable medium of claim 9, the operations further comprising:

providing internal telemetry data to an external device, the internal telemetry data indicating a processing capability and a storage capability of each accelerator of the plurality of accelerators;

receiving external telemetry data from the external device, the external telemetry data indicating a processing capability and a storage capability of an external accelerator comprising an external NFD module within the external device; and updating the configuration table based on the external telemetry data, the updated configuration table comprising the internal telemetry data and the external telemetry data.

14. The non-transitory computer-readable medium of claim 13, wherein:

the operations further comprise identifying the external accelerator based on the external telemetry data; and the internal telemetry data comprises data indicating at least one of a pending interest table, a routing information base, a content store, an amount of traffic, and a request to the content store corresponding to the plurality of accelerators.

15. The non-transitory computer-readable medium of claim 13, wherein the interest packet comprises a first interest packet, the workload request comprises a first workload request, the offloaded NED module comprises a first offloaded NFD module, and the identified accelerator comprises a first identified accelerator, the operations further comprising:

receiving a second interest packet comprising a second workload request, the second interest packet configured according to the NDN protocol;

identifying the external NFD module of the external accelerator within the external device as being configured to perform the second workload request based on the updated configuration table; and offloading the second workload request to the external NFD module to perform the second workload request using the external accelerator.

16. The non-transitory computer-readable medium of claim 9, wherein the interest packet comprises a first interest packet, the workload request comprises a first workload request, the offloaded NFD module comprises a first offloaded NFD module, and the identified accelerator comprises a first identified accelerator, the operations further comprising:

identifying a second accelerator of the plurality of accelerators on which to configure a second offloaded NFD module based on the configuration table;

configuring the second offloaded NFD module on the second identified accelerator;

updating the configuration table based on the second identified accelerator and the second offloaded NFD module;

receiving a second interest packet comprising a second workload request;

determining that the second offloaded NFD module is configured to perform the second workload request using the second identified accelerator based on the updated configuration table; and offloading, via the application programming interface, the second workload request to the second offloaded NFD module to perform the second workload request using the second identified accelerator.

17. The non-transitory computer-readable medium of claim 9, wherein the plurality of accelerators comprise at least two of a cross-architecture processing unit, a field programmable gate array, an application-specific integrated circuit, a general processing unit, and a centralized processing unit.

18. The non-transitory computer-readable medium of claim 9, the operations further comprise initializing a plurality of interfaces comprising at least one of a peripheral component interconnect express interface, a transmission control protocol/Internet protocol overlay tunnel, an inter-process communication interface, an Ethernet interface, and a wireless fidelity interface.

19. A system comprising:

means to identify an accelerator of a plurality of accelerators on which to configure an offloaded NFD module based on a configuration table indicating a current configuration of the plurality of accelerators;

means to configure the offloaded NFD module on the identified accelerator;

means to receive an interest packet including a workload request, the interest packet configured according to an NDN protocol;

means to determine that the offloaded NFD module is configured to perform the workload request using the identified accelerator based on the configuration table; and means to offload, via an application programming interface, the workload request to the offloaded NFD module to perform the workload request using the identified accelerator.

20. The system of claim 19 further comprising:

means to provide internal telemetry data to an external device, the internal telemetry data indicating a processing capability and a storage capability of each accelerator of the plurality of accelerators;

means to receive external telemetry data from the external device, the external telemetry data indicating a processing capability and a storage capability of an external accelerator including an external NFD module within the external device; and means to update the configuration table based on the external telemetry data, the updated configuration table including the internal telemetry data and the external telemetry data.

\* \* \* \* \*